United States Patent [19]

Knepler

[11] Patent Number: 5,309,821
[45] Date of Patent: May 10, 1994

[54] COFFEE BREWING URN

[75] Inventor: John T. Knepler, Chatham, Ill.

[73] Assignee: Bunn-O-Matic Corporation, Springfield, Ill.

[21] Appl. No.: 889,790

[22] Filed: May 28, 1992

[51] Int. Cl.$^5$ .............................................. A47J 31/14
[52] U.S. Cl. ........................................ 99/282; 99/281; 99/291; 99/307; 99/316; 392/450
[58] Field of Search .................. 99/279, 281, 282, 291, 99/294, 298, 300, 304–307, 316, 317; 392/445, 450

[56] References Cited

U.S. PATENT DOCUMENTS

| | | | |
|---|---|---|---|
| 846,163 | 3/1907 | Stubinger | 99/307 |
| 1,910,514 | 5/1933 | Ashenden | 99/291 |
| 2,422,580 | 6/1947 | Meier | 99/291 |
| 2,485,246 | 10/1949 | Swanson | 99/291 |
| 2,490,501 | 12/1949 | Ashenden, Jr. | 99/305 |
| 3,459,118 | 8/1969 | Hausam | 99/291 |
| 3,593,650 | 7/1971 | Martin | 99/291 |
| 3,608,471 | 7/1970 | Martin | 99/283 |
| 3,787,659 | 1/1974 | Olland | 99/281 |
| 4,575,615 | 3/1986 | Shigenobu et al. | 99/279 |

FOREIGN PATENT DOCUMENTS

| | | | |
|---|---|---|---|
| 52-72956 | 6/1977 | Japan | 392/450 |
| 386071 | 3/1965 | Switzerland | 99/282 |

OTHER PUBLICATIONS

Bunn-O-Matic U3 Urn product literature, copyright 1990.

Bunn-O-Matic Coffee Brewer-Model U3, Operating & Service Manual, copyright 1984.

Primary Examiner—Harvey C. Hornsby
Assistant Examiner—Mark Spisich
Attorney, Agent, or Firm—Trexler, Bushnell, Giangiorgi & Blackstone, Ltd.

[57] ABSTRACT

A beverage brewing apparatus which includes a tank for containing heated water. Partitions are positioned in the heated water tank to define holding sections and a brewing section. Water is introduced into the holding sections of the tank and heated therein to a temperature of 180°. Water retained in the heated water tank may pass from the holding sections around the partitions to the brewing section. A beverage holding reservoir is disposed in each of the holding sections of the tank so that heat from the water in the holding sections maintains a beverage disposed in the holding reservoirs at a desired temperature. A brewing assembly is associated with the holding reservoir and a dispensing head on a swing arm communicates with the brewing section and is positionable in relation to each of the brewing assemblies. A sensor and heater in the brewing section maintain the water retained therein at a temperature of 200°. Water is pumped from the brewing section through the swing arm and into a selected brewing assembly to produce a brewed beverage therefrom. The swing arm includes two activating fingers which controllably activate a switch on the brewing apparatus to control flow of water through the swing arm and prevent flow therethrough when the swing arm.

12 Claims, 2 Drawing Sheets

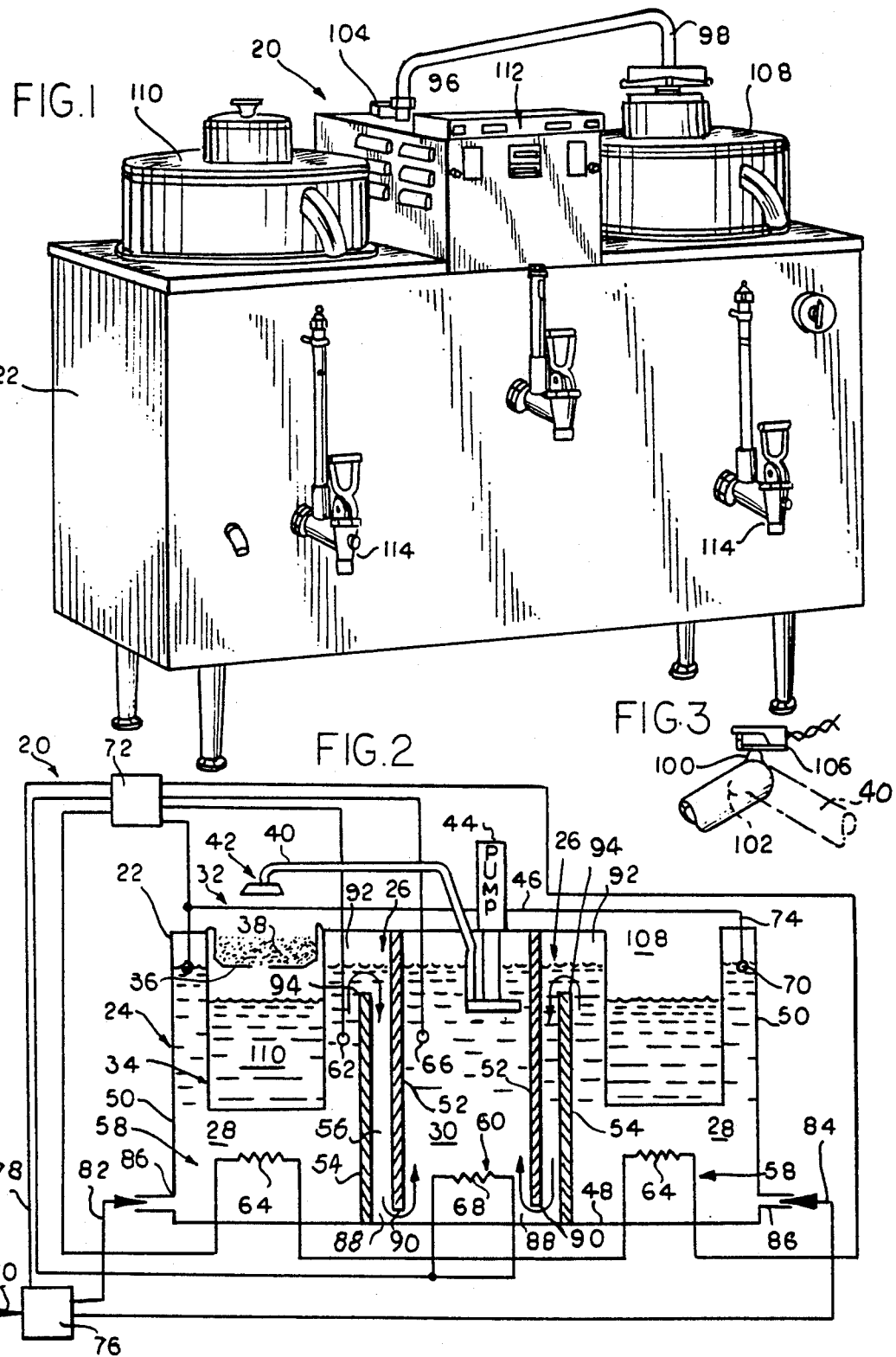

COFFEE BREWING URN

BACKGROUND OF THE INVENTION

This invention pertains to beverage brewers and more particularly to urn-type brewers which have a beverage holding reservoir disposed in a heated water tank.

Urn-type coffee brewers are commonly used to produce large quantities of brewed beverage on demand and to maintain the brewed beverage at a predetermined desired temperature. Examples of the urn-type beverage brewer are shown in U.S. Pat. No. 3,593,650 to Martin, issued Jul. 20, 1971 and U.S Pat. No. 3,608,471 to Martin, issued Sep. 28, 1971. As shown in the Martin patents, the urn-type brewer employs a large heated water tank in which is disposed at least two coffee brewing assemblies. Each coffee brewing assembly includes a holding reservoir, a filter assembly, and a spigot in communication with the holding reservoir. Water is heated in the tank portion and dispensed through a swing arm type dispensing head which can be moved into position over either one of the brewing assemblies. Heated water from the tank is pumped through the swing arm into a funnel assembly to infuse beverage brewing substance retained in the funnel and dispense the brewed beverage extract into the holding reservoir. The brewed beverage retained in the reservoir is maintained at a desired temperature by the heated brewing water surrounding the reservoir.

Several problems arise with regard to the urn-type brewer arrangement as shown in the Martin patents. One problem that arises with urn-type brewing devices is that a single water temperature is used for both brewing water and for maintaining the brewed beverage in a heated state prior to serving. This is a problem because generally accepted brewing practices require that the brewed beverage be maintained at a temperature of 180° whereas the preferred optimum brewing water temperature is 200°. As noted above, the urn-type brewing apparatus employs a single tank which retains heated water used for both brewing and for maintaining the brewed beverage in a heated state prior to serving. Because the urn-type brewing apparatus has a single chamber, the temperature of the water in the chamber is generally constant. Since prior art beverage brewing devices use a single chamber, either the temperature must be maintained at a temperature which is much higher than desired for a brewed beverage or at a temperature which is much lower than the temperature required for optimum beverage brewing.

Another problem arises when an operator fails to properly position the swing arm over one of the brewing baskets before starting the brew cycle. This situation is problematic in that the heated water may be sprayed on the operator or over the brewing apparatus which could potentially cause problems for the operator or the brewing apparatus.

The Martin '471 patent attempts to overcome this problem by requiring an operator to depress two switches in order to start the brewing cycle. The operation of two switches is intended to induce the operator to observe the position of the swing spout with regard to one of the brewing assemblies. While the device as shown in Martin '471 does help promote the safe operation of an urn-type brewing apparatus, it still requires operation of switches which are independent from the position of the swing spout. For example, if an operator fails to check the position of the swing spout before activating the switches, the brew cycle may be initiated with the swing spout in the wrong position.

As such, it would be desirable to have an urn-type brewing apparatus which provides for control of the flow through the swing spout independent of the switches which activate the brewing cycle.

As such, it would be desirable to provide a beverage brewing apparatus which would maintain the brewed beverage at approximately 180° and provide instantaneous hot water for brewing at a temperature of 200°. No known urn-type beverage brewing apparatus overcomes the problems discussed hereinabove.

OBJECTS AND SUMMARY OF THE INVENTION

It is a general object of the present invention to provide an urn-type brewing apparatus which provides water at two different temperatures for maintaining a brewed beverage at a first temperature and for infusing a beverage brewing substance with water at a second temperature.

Another object of the present invention is to provide an urn-type beverage brewing apparatus having a swing arm for dispensing brew water into a brewing assembly which controls the flow of brew water through the brew arm based on the position of the brew arm relative to a brewing assembly.

A further object of the present invention is to provide a beverage brewing apparatus which maintains high volume beverage production while requiring minimum recovery time to maintain the brewing water at a desired 200° temperature.

Still a further object of the present invention is to provide an urn-type brewing apparatus which provides a holding temperature of 180° and a brewing temperature of 200° in a common heated water tank.

Briefly, and in accordance with the foregoing, the present invention comprises a beverage brewing apparatus which includes a tank for containing heated water. Partitions are positioned in the heated water tank to define holding sections and a brewing section. Water is introduced into the holding sections of the tank and heated therein to a temperature of 180°. Water retained in the heated water tank may pass from the holding sections around the partitions to the brewing section. A beverage holding reservoir is disposed in each of the holding sections of the tank so that heat from the water in the holding sections maintains a beverage disposed in the holding reservoirs at a desired temperature. A brewing assembly is associated with the holding reservoir and a dispensing head on a swing arm communicates with the brewing section and is positionable in relation to each of the brewing assemblies. A sensor and heater in the brewing section maintain the water retained therein at a temperature of 200°. Water is pumped from the brewing section through the swing arm and into a selected brewing assembly to produce a brewed beverage therefrom. The swing arm includes two activating fingers which controllably activate a switch on the brewing apparatus to control flow of water through the swing arm. Control of the water flowing through the swing arm in this manner prevents flow therethrough when the swing arm is not properly positioned over one of the brewing assemblies.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a perspective view of an urn-type beverage brewing apparatus having a housing containing a common tank for retaining heated water and a swing arm which is positionable between beverage brewing assemblies disposed in the tank;

FIG. 2 is a diagrammatic representation of the urn-type beverage brewing apparatus as illustrated in FIG. 1 showing the tank divided by partitions positioned therein to define a brewing section between two holding sections;

FIG. 3 is an enlarged partial fragmentary plan view of a portion of the swing arm which controls flow of water through the swing arm to prevent discharge of water therethrough when the swing arm is not positioned over one of the beverage brewing assemblies.

DETAILED DESCRIPTION OF THE ILLUSTRATED EMBODIMENT

Figure 4:
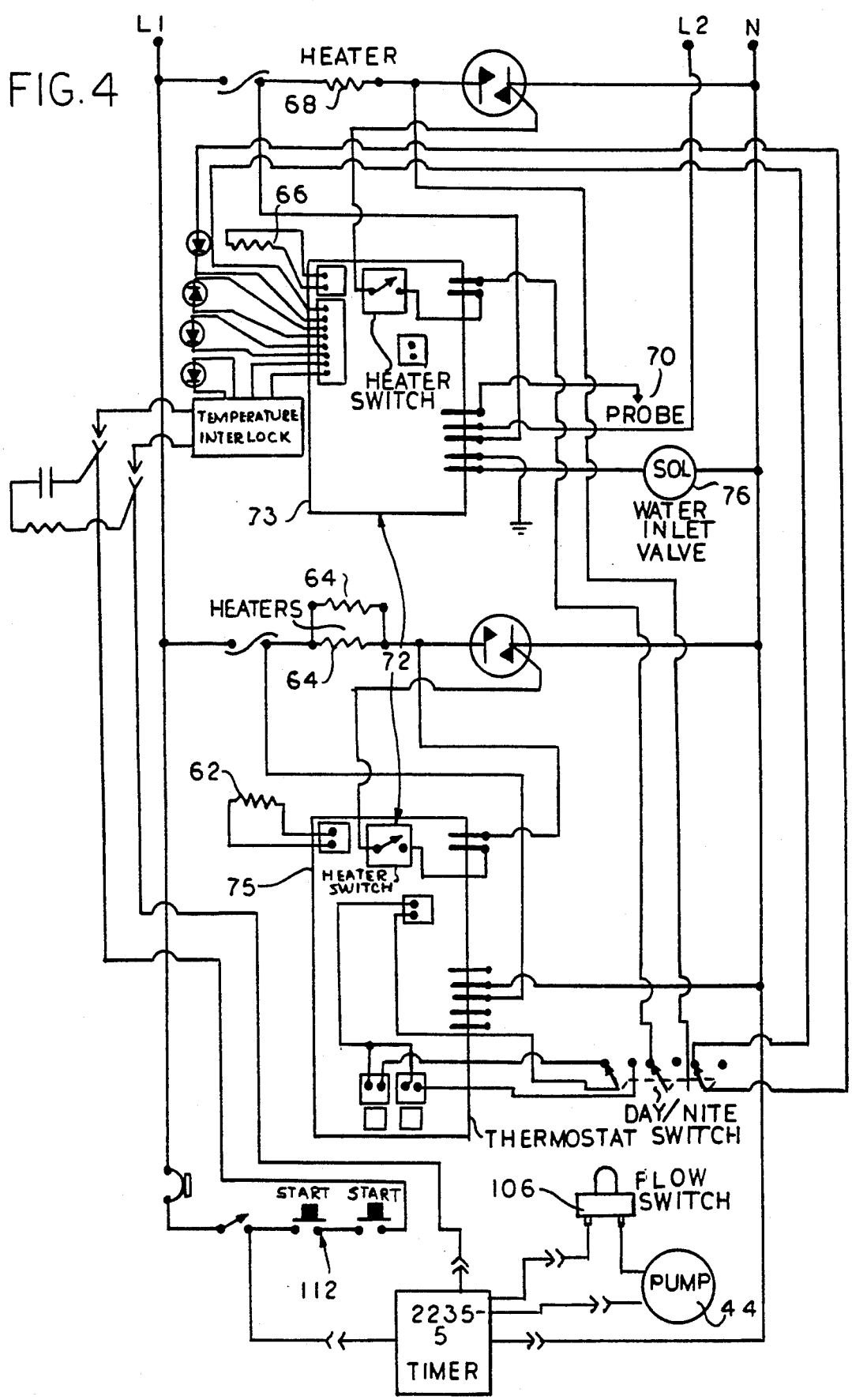
FIG. 4 is an electrical schematic of the present invention.

While the invention may be susceptible to embodiment in different forms, there is shown in the drawings, and herein will be described in detail, a specific embodiment with the understanding that the present disclosure is to be considered an exemplification of the principles of the invention and is not intended to limit the invention to that as illustrated and described herein.

Referring now to the drawings, wherein like parts are designated by the same reference numerals throughout the figures, a beverage brewing apparatus 20 in accordance with the present invention is shown in FIG. 1.

With reference to FIGS. 2 and 3, the beverage brewing apparatus 20 is commonly referred to as an urn-type brewer 20 and includes a housing 22 which defines a hot water tank 24 for retaining water in a heated condition for brewing beverages. Means 26 for dividing the tank 24 divide the tank into at least one holding section 28 and a brewing section 30. A brewing assembly 32 is disposed in each of the holding sections 28 as shown in FIG. 2. While FIG. 2 shows an embodiment which provides two holding sections 28 and a brewing section 30 positioned therebetween, a device could be provided having more than two holding sections or only one holding section.

The beverage brewing assembly 32 disposed in the holding section 28 includes a holding reservoir 34 which extends into the water retained in the holding section 28 and a funnel 36 which is positionable over the holding reservoir 34 for retaining a beverage brewing substance 38 therein.

A hollow arm 40 is positioned in communication with the brewing section 30 for dispensing water from the brewing section 30 into the brewing funnel 36 of the beverage brewing assembly 32 to infuse the brewing substance 38 retained in the funnel 36 to produce a brewed beverage which is retained in the holding reservoir 34. A dispensing head 42 is attached to one end of the hollow arm 40 to broadly distribute water over the beverage brewing substance 38 to thoroughly and efficiently infuse the substance. A pump 44 is used to move the water from the brewing section 30 through the arm 40 to the brewing assembly 32.

The tank 24 has a top 46, a bottom 48 and sides 50. Means 26 for dividing the tank 24 include a first partition 52 and a second partition 54. The first and second partitions 52,54 are spaced apart and define a channel 56 therebetween which allows water to flow from the holding section 28 past the second partition 54 through the channel 56 and past the first partition 52 into the brewing section 30.

Each holding section 28 includes first means 58 for controllably heating the water retained in the holding section 28. The brewing section includes second means 60 for controllably heating the water retained in the brewing section 30 independently of the first means 58 for heating water. The first means 58 includes a first sensor 62 and a water heater 64 operatively associated with the holding section 28. The second means 60 includes a brewing temperature sensor 66 and a brewing water heater 68. The sensors 62,66 and the heaters 64,68 are generally of a known construction.

Additionally, a water level sensor 70 is positioned in the holding section 28 to determine the level of water retained therein. When the level sensor 70 detects a low water level condition, it signals a control unit 72 over line 74 to indicate the low level condition. The portion 73 of control unit 72, which includes thermostats 73 and 75 (see FIG. 4), then activates an automatic inlet valve 76 over line 78 to allow water to flow from the inlet line 80 through respective feed lines 82,84 into the water inlets 86 positioned towards the bottom 48 of the tank 24.

The water heaters 64 in the holding sections 28 are located towards the bottom 48 of the tank to rapidly heat the water entering through the water inlets 86. As the water is heated by the heaters 64, the heated water tends to rise and create a temperature stratification within the holding sections 28. The partitions 52,54 are arranged so that the first partition 52 extends between sides 50 of the tank 24 and extends downwardly towards the bottom 48. The first partition 52 is spaced away from the bottom 48 so that a lower passage 88 is defined between a lower edge 90 of the first partition 52 and the bottom 48. The second partition 54 extends between the sides 50 and upwardly towards the top 46. An upper passage 92 is defined between an upper edge 94 of the second partition 54 and the top 46 of the tank 24.

When water entering the holding sections 28 is heated, it rises towards an upper portion of the holding section 28. The water in the upper section is generally at 180° as it is the warmest water in the holding section 28. The water in the upper section of the holding section 28 flows through the upper passage 92 and then down through the channel 56 and through the lower passage 88 into the brewing section 30. Flow through the upper passage 92, channel 56, and lower passage 88 is induced by the action of water being dispensed from the brewing section 30 through the hollow arm 40.

As can be seen from the above discussion, the holding sections 28 act as preheating areas for water which subsequently flows into the brewing section 30 and out into the brewing assembly 32. Division of the tank 24 into the sections 28,30 achieves the goal of maintaining the brewed beverage retained in the holding reservoir 34 at a first temperature (180°) while maintaining a segregated quantity of water in the brewing section 30 at a second temperature (200°). As shown in FIG. 2, the illustrated embodiment employs a single sensor 62 to determine the temperature of the water in the holding section 28 and a single sensor 66 to detect the temperature of the water in the brewing section 30. While multiple sensors could be used for detecting the temperature of the water in the holding sections 28, a single sensor 62 is used to detect the temperature in one of the holding sections 28 and to control both heaters 64,64 positioned in the holding sections 28,28.

With particular reference to FIGS. 1 and 3, the hollow arm 40 is attached at a first end 96 in communication with the brewing section 30 and the dispensing head 42 which is attached at a second end 98. The second end 98 is movable so that it may be positioned over each of the beverage brewing assemblies 32 to deliver water thereto. It is important to assure that the dispensing head 42 is positioned over the funnel 36 of the brewing assembly 32 so that the water (heated to 200°) is properly dispensed into the funnel 36 and not onto the surrounding housing of the apparatus or the operator. The first end 96 permits the hollow tube 40 to be moved between the beverage brewing assemblies 32,32.

With more specific reference to FIG. 3, a partial fragmentary section of the hollow arm 40 is shown in plan view. As shown in FIG. 3, two activating fingers 100,102 are formed on a vertical section 104 of the hollow arm 40. The activating fingers 100,102 contact a flow switch 106 which is operatively positioned on a corresponding portion of the housing of the apparatus 20. The flow switch 106 is operatively coupled to the control unit 72 for controlling the flow of brew water through the hollow arm 40. When the hollow arm 40 is positioned over the right brewing assembly 108, the activating finger 100 actuates the switch 106 permitting water to flow therethrough. When the hollow arm 40 is moved from a position over the right brewing assembly to a position over the left brewing assembly 110 (as shown in FIG. 2), the second activating finger 102 actuates the switch 106. When the arm 40 is in a position which is not aligned with either of the brewing assemblies 108,110, neither activating finger 100,102 actuates the switch 106 and thereby water is not permitted to flow through the hollow arm 40.

With reference to the schematic as shown in FIG. 4, it can be seen that the switch 106 controls operation of the pump 44. The switch 106 when activated by the activating fingers 100,102 allows the pump 44 to pump water from the brewing section 30. When the switch 106 is not activated, the pump 44 cannot be operated and thus water cannot flow from the brewing section 30.

In use, the tank 24 is initially filled with water to a predetermined desired level as indicated by the water sensing probe 70 in the holding sections 28 so that the holding sections 28,28 and the brewing section 30 are sufficiently filled. Once the water in the holding sections 28 is heated by the heaters 64 to a predetermined desired temperature of approximately 180° as sensed by the sensor 62 and the water in the brewing section is sufficiently heated to approximately 200° by the brewing heater 88 as sensed by the sensor 66, the apparatus 20 is prepared to brew a beverage.

Beverage is brewed by positioning the funnel 36 with beverage brewing substance 38 disposed therein over a holding reservoir 34. When an activation switch 112 is activated, the pump 44 will begin pumping water from the brewing section 30 through the hollow arm 40 and out through the dispensing head 42 to infuse the brewing substance 38. If the arm 40 is not properly positioned, the corresponding activating finger 100,102 will not activate the switch 106 and will prevent the pump 44 from pumping water from the brewing section 30. Once the arm 40 is properly positioned, the beverage brewing substance 38 is infused and a brewed beverage is dispensed into the holding reservoir 34. The brewed beverage is maintained at a temperature of approximately 180° by the water in the holding section 28 which surrounds the reservoir 34.

As water is pumped from the brewing section 30, replacement water flows around the first and second partitions 52,54 over the upper passage 92 through the channel 56 and through the lower passage 88. The level sensors 70 detect when a predetermined low level condition is achieved and indicate to the control unit 72 to operate the automatic inlet valve 76 to permit water to flow from the inlet line 80 through the feed lines 82 and in through the water inlets 86 into the holding sections 28. As unheated water flows through the inlets 86,86, the temperature of the water in the holding section tends to drop. The drop in temperature is detected by the sensor 62 in one of the holding sections 28 which there indicates that the heaters 64 should be activated. Likewise, as the temperature of the water in the brewing section 30 drops, the sensor 66 will detect the temperature drop and activate the brewing heater 68.

When the pump 44 stops pumping the desired quantity of water through the arm 40 at the end of the brewing cycle, the level sensors 70 will detect the rise in level in the holding sections 28 and at a predetermined desired level indicate to the control unit 72 to close the inlet valve 76. Once water stops flowing into the holding sections 28, the water in the holding sections will gradually increase to a generally consistent temperature of 180°. When the sensor 62 detects a temperature of 180°, the heater 64 is turned off until a predetermined temperature drop is sensed. Similarly, when the sensor 66 in the brewing section 30 detects a predetermined temperature of 200°, the heater 68 is turned off. As such, in the brewing section water 30 is prepared for another brewing cycle. The brewing section 30 is designed to have a capacity for multiple brews such that two or more holding reservoirs 34 may be filled with a brewed beverage in rapid succession. Spigots 114 project through the housing 22 into the holding reservoirs 34 to permit the brewed beverage retained therein to be drawn off in desired quantities. By the time the brewed beverage is drained from the holding reservoir 34, the temperature of the water in the brewing section 30 will be at 200° thereby permitting another sequence of brew cycles.

By maintaining the brewing section 30 at 200° and the holding sections 28 at 180°, the beverage retained in the holding reservoir 34 is maintained at the optimum temperature of 180° and the beverage brewing substance 38 is infused with water at the optimum brewing temperature of 200°. Partitioning of the tank 24 into the holding sections 28 and the brewing section 30 provides for preheated water to 180° which is controllably flowed into the brewing section 30 for heating to elevate the temperature only an additional 20°. As such, the present invention achieves the goals of maintaining a brewed beverage at an optimum serving temperature and maintaining brewing water at optimum brewing temperature in a common tank 24. Further, the present invention achieves the goal of providing additional safety features to prevent the unintentional dispensing of brewing waters through the arm 40 when the arm is not positioned over one of the brewing assemblies 108,110.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A beverage brewing apparatus comprising:
    a tank for containing heater water;
    means for dividing said tank defining a holding section which receives water and a brewing section, said dividing means defining a baffle passage allowing water to flow from said holding section to said brewing section;
    a beverage brewing assembly disposed in said holding section, said beverage brewing assembly including a reservoir for holding a brewed beverage, said reservoir being surrounded by water retained in said holding section;
    a dispensing head communicating with said brewing section and said beverage brewing assembly for dispensing water from said brewing section into said beverage brewing assembly;
    first means for controllably heating water operatively associated with said holding section;
    second means for controllably heating water operatively associated with said brewing section independent of said first means for heating water.

2. A beverage brewing apparatus as recited in claim 1, further including means for controlling water flow from said brewing section to said beverage brewing assembly operatively associated with said dispensing head for controlling water flow therethrough.

3. A beverage brewing apparatus as recited in claim 2, wherein:
    said dispensing head includes a hollow arm having a first end and a second end, said first end communicating with said brewing section and said second end being movably positionable for delivering water from said brewing section to said beverage brewing assembly; and
    said means for controlling water flow includes a switch operatively associated with said hollow arm, said switch being activated by said hollow arm when said second end of said arm is positioned to deliver water to said beverage brewing assembly.

4. A beverage brewing apparatus as recited in claim 1, wherein:
    said first means for controllably heating water includes a first sensor operatively associated with said holding section for detecting the temperature of water retained in said holding section, and a first water heater operatively associated with said holding section and coupled with said first sensor for heating water retained in said holding section; and
    said second means for controllably heating water includes a second sensor operatively associated with said brewing section for detecting the temperature of water retained in said brewing section, and a second water heater operatively associated with said brewing section and coupled with said second sensor for heating water retained in said brewing section independent of said first sensor and said first water heater.

5. A beverage brewing apparatus comprising:
    a tank for containing heated water;
    means for dividing said tank defining a holding section and a brewing section, said holding section communicating with said brewing section;
    said tank including a top, a bottom, and sides extending between said top and bottom and said means for dividing said tank including a first partition and a second partition;
    said first partition extending between sides of said tank and downwardly towards said bottom of said tank, a lower edge of said first partition spaced apart form said bottom of said tank defining a lower passage;
    said second partition extending in between sides of said tank and upwardly towards said top of said tank, an upper edge of said second partition spaced apart from said top of said tank defining an upper passage between an upper edge of said second partition spaced apart from said top of said tank; and
    a channel extending between said first partition and said second partition and connecting said upper passage and said lower passage allowing water in said tank to flow from said holding section to said brewing section.

6. A beverage brewing apparatus as recited in claim 5, wherein said first and second partitions define a brewing section in communication with two holding sections, each of said holding sections having a beverage brewing assembly disposed therein, said dispensing head being operable between said two beverage brewing assemblies.

7. A beverage brewing apparatus comprising:
    a tank for containing heated water;
    means for dividing said tank defining a holding section which receives water and a brewing section, said dividing means defining a baffle passage allowing water to flow from said holding section to said brewing section;
    a beverage holding reservoir disposed in said holding section, said beverage brewing assembly including a reservoir for holding a brewed beverage, said reservoir being surrounded by water retained in said holding section;
    a brewing funnel for retaining a brewing substance communicating with said beverage holding reservoir;
    a dispensing head communicating with said brewing section and said brewing funnel for dispensing water from said brewing section into said funnel to infuse brewing substance retained in said brewing funnel and dispensing brewed beverage into said beverage holding reservoir;
    a first sensor operatively associated with said holding section for detecting the temperature of water retained in said holding section;
    a second sensor operatively associated with said brewing section for detecting the temperature of water retained in said brewing section;
    first means for heating operatively associated with said holding section and coupled with said first sensor for heating water retained in said holding section;
    second means for heating operatively associated with said brewing section and coupled with said second sensor for heating water retained in said brewing section independent of said first sensor and said first means for heating.

8. A beverage brewing apparatus comprising:

a tank for containing heated water;

means for dividing said tank defining a holding section and a brewing section, said holding section communicating with said brewing section, said means for dividing said tank including a first partition and a second partition;

a beverage holding reservoir disposed in said holding section, a brewing funnel for retaining a brewing substance communicating with said beverage holding reservoir;

a dispensing head communicating with said brewing section and said brewing funnel for dispensing water from said brewing section into said funnel to infuse brewing substance retained in said brewing funnel and dispensing brewed beverage into said beverage holding reservoir;

a first sensor operatively associated with said holding section for detecting the temperature of water retain in said holding section;

a second sensor operatively associated with said brewing section for detecting the temperature of water retained in said brewing section;

first means for heating operatively associated with said holding section and coupled with said first sensor for heating water retained said holding section;

second means for heating operatively associated with said brewing section and coupled with said second sensor for heating water retained in said brewing section independent of said first sensor and said first means for heating; and a channel extending between said first partition and said second partition allowing water in said tank to pass from said holding section to said brewing section.

9. A beverage brewing apparatus as recited in claim 8, wherein said tank includes a top, a bottom, and sides extending between said top and bottom;

said first partition extending downwardly towards said bottom and defining a lower passage between a lower edge of said first partition spaced apart from said bottom of said tank;

said second partition extending upwardly towards said top and defining an upper passage between an upper edge of said second partition spaced apart from said top of said tank;

said channel extending between said first partition and said second partition connecting said upper passage and said lower passage.

10. A beverage brewing apparatus as recited in claim 8, wherein said tank includes a top, a bottom, and sides extending between said top and bottom;

said brewing section being defined by said first partition extending downwardly towards said bottom, said first partition defining a lower passage between a lower edge of said first partition spaced apart from said bottom of said tank;

said holding section being defined by said second partition extending upwardly towards said top and defining an upper passage between an upper edge of said second partition spaced apart from said top of said tank, said second partition being spaced away from said first partition;

said channel extending between said first partition and said second partition connecting said upper passage and said lower passage.

11. A beverage brewing apparatus as recited in claim 10, further including:

two first partitions and a two second partitions extending between sides of said tank;

said brewing section being defined between said two first partitions;

said two second partitions being spaced away from said first partitions and located outside said brewing section defining two holding sections;

two channels extending between each pair of said two first and second partitions.

12. A beverage brewing apparatus comprising:

a tank for containing heated water;

at least two dividing means for dividing said tank defining at least two holding sections and a brewing section, each of said dividing means defining a baffle passage allowing water to flow from both of said holding sections to said brewing section;

a beverage brewing assembly disposed in each of said holding section, each of said beverage brewing assemblies including a reservoir for holding a brewed beverage, said reservoir being surrounded by water retained in the corresponding one of said holding sections;

a movable dispensing head communicating with said brewing section and being positionable for communicating with each said beverage brewing assemblies for dispensing water from said brewing section into one of said beverage brewing assemblies;

means for controlling water flow from said brewing section to a selected one of said beverage brewing assemblies operatively associated with said dispensing head;

a first sensor operatively associated with one of said holding sections for detecting the temperature of water retained in said holding section;

a second sensor operatively associated with said brewing section for detecting the temperature of water retained in said brewing section;

a first water heater operatively associated with each of said holding sections and coupled with said first sensor for heating water retained in each of said holding sections, and a beverage holding reservoir associated with each of said beverage brewing assemblies disposed in a corresponding one of said holding sections;

a second water heater operatively associated with said brewing section and coupled with said second sensor for heating water retained in said brewing section independent of said first sensor and said first water heater.

* * * * *

UNITED STATES PATENT AND TRADEMARK OFFICE
CERTIFICATE OF CORRECTION

PATENT NO. : 5,309,821
DATED : May 10, 1994
INVENTOR(S) : John T. Knepler

It is certified that error appears in the above-indentified patent and that said Letters Patent is hereby corrected as shown below:

Column 6, Line 42 "in the brewing" should be -- the heated brewing --

Signed and Sealed this

Twentieth Day of September, 1994

Attest:

BRUCE LEHMAN

Attesting Officer

Commissioner of Patents and Trademarks